United States Patent
Mourachov et al.

(10) Patent No.: US 12,177,270 B2
(45) Date of Patent: Dec. 24, 2024

(54) REAL-TIME UPDATES FOR DOCUMENT COLLABORATION SESSIONS IN A GROUP-BASED COMMUNICATION SYSTEM

(71) Applicant: Salesforce, Inc., San Francisco, CA (US)

(72) Inventors: Serguei Mourachov, Vancouver (CA); Sameera Thangudu, San Francisco, CA (US); Manju Vijayakumar, Fremont, CA (US); Gabriel Adomnicai, San Francisco, CA (US); Kimberly Van Anh Nguyen, Oakland, CA (US); Eric M. Halpern, San Francisco, CA (US); Dan Willhite, West Bath, ME (US); Brett Griffin Wines, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 54 days.

(21) Appl. No.: 18/078,279

(22) Filed: Dec. 9, 2022

(65) Prior Publication Data

US 2024/0195847 A1 Jun. 13, 2024

(51) Int. Cl.
*G06F 15/16* (2006.01)
*H04L 65/1069* (2022.01)
(Continued)

(52) U.S. Cl.
CPC ...... *H04L 65/1093* (2013.01); *H04L 65/1069* (2013.01); *H04L 65/1073* (2013.01)

(58) Field of Classification Search
CPC ............. H04L 65/1093; H04L 65/1069; H04L 65/1073
See application file for complete search history.

(56) References Cited

U.S. PATENT DOCUMENTS

RE42,883 E * 11/2011 Korycki ............. H04M 7/1255
709/204
8,892,446 B2 11/2014 Cheyer et al.
(Continued)

FOREIGN PATENT DOCUMENTS

EP 3623937 A1 3/2020
JP 2022126651 A 8/2022

OTHER PUBLICATIONS

PCT Patent Application PCT/US2023/021928 International Search Report and Written Opinion of the International Searching Authority issued Aug. 30, 2023.
(Continued)

*Primary Examiner* — Moustafa M Meky
*Assistant Examiner* — Thorne E Waugh
(74) *Attorney, Agent, or Firm* — Lee & Hayes, P.C.

(57) ABSTRACT

Media, methods, and systems are provided for real-time updates of collaborative documents in a group-based communication system. Collaborative documents may allow for multiple users to simultaneously modify and edit a document. When a collaborative document is created, a server may create an ephemeral channel and an identifier for the collaborative document. As users connect to the collaborative document, the users may be assigned a temporary subscription to the collaborative document. Real-time events, such as indications that a user is typing, indications that a user is connected in the collaborative document, and changes to the collaborative document may be published to the user via the temporary subscription. When the user disconnects from the document, the real-time events may no longer be communicated.

20 Claims, 8 Drawing Sheets

(51) Int. Cl.
*H04L 65/1073* (2022.01)
*H04L 65/1093* (2022.01)

(56) References Cited

U.S. PATENT DOCUMENTS

| | | | |
|---|---|---|---|
| 9,940,394 | B1 | 4/2018 | Grant et al. |
| 9,992,241 | B1* | 6/2018 | Huang .................. H04L 65/401 |
| 10,229,204 | B1 | 3/2019 | Grant et al. |
| 10,229,205 | B1 | 3/2019 | Grant et al. |
| 10,389,770 | B2* | 8/2019 | Pogorelik ........... H04L 65/1089 |
| 10,397,624 | B1 | 8/2019 | Largman et al. |
| 10,506,032 | B2 | 12/2019 | Largman et al. |
| 10,521,498 | B2* | 12/2019 | Pereira Filho ........ G06F 40/166 |
| 10,606,576 | B1 | 3/2020 | Tung et al. |
| 10,630,627 | B2 | 4/2020 | Wills et al. |
| 10,698,706 | B1 | 6/2020 | Rabe et al. |
| 10,846,349 | B1 | 11/2020 | Grant et al. |
| 10,970,486 | B2 | 4/2021 | Machado et al. |
| 10,972,795 | B2 | 4/2021 | Largman et al. |
| 11,190,368 | B1 | 11/2021 | Haynes et al. |
| 11,240,316 | B1* | 2/2022 | Gracey .............. H04L 65/4015 |
| 11,477,296 | B2 | 10/2022 | Gibbs et al. |
| 11,520,780 | B2 | 12/2022 | Boodman et al. |
| 11,544,465 | B2 | 1/2023 | Machado et al. |
| 11,582,500 | B2* | 2/2023 | Largman ............ H04N 21/6581 |
| 11,586,686 | B2 | 2/2023 | Grant et al. |
| 11,750,672 | B2* | 9/2023 | Chanda ............... H04L 65/403 |
| | | | 709/227 |
| 11,810,072 | B2* | 11/2023 | Frank .................... H04W 12/08 |
| 2002/0078150 | A1* | 6/2002 | Thompson ............ H04M 7/003 |
| | | | 709/227 |
| 2008/0155112 | A1* | 6/2008 | Ma .......................... H04L 67/55 |
| | | | 709/231 |
| 2010/0257457 | A1* | 10/2010 | De Goes ............. H04L 65/1093 |
| | | | 707/E17.007 |
| 2012/0221629 | A1* | 8/2012 | Zeevi ...................... G06F 9/54 |
| | | | 709/203 |
| 2013/0080919 | A1* | 3/2013 | Kiang .................... H04L 67/63 |
| | | | 715/753 |
| 2013/0154958 | A1 | 6/2013 | Clavin et al. |
| 2014/0169767 | A1* | 6/2014 | Goldberg ............... G06Q 10/10 |
| | | | 386/282 |
| 2015/0264023 | A1 | 9/2015 | Reno |
| 2015/0312284 | A1* | 10/2015 | Mihara ............... H04L 65/4038 |
| | | | 370/260 |
| 2019/0097823 | A1* | 3/2019 | Simonyi ............... G06F 40/197 |
| 2019/0334983 | A1 | 10/2019 | Largman et al. |
| 2019/0394257 | A1* | 12/2019 | Estes .................... G06F 40/166 |
| 2020/0267106 | A1 | 8/2020 | Wills et al. |
| 2020/0410583 | A1 | 12/2020 | Hart et al. |
| 2020/0412708 | A1 | 12/2020 | Oberoi et al. |
| 2021/0118325 | A1 | 4/2021 | Gupta et al. |
| 2021/0141865 | A1 | 5/2021 | Machado et al. |
| 2021/0149688 | A1* | 5/2021 | Newell ................. G06F 40/186 |
| 2021/0182087 | A1 | 6/2021 | Park et al. |
| 2021/0365806 | A1 | 11/2021 | Sumanth et al. |
| 2022/0012236 | A1 | 1/2022 | Harrison et al. |
| 2022/0109706 | A1* | 4/2022 | Butterfield .......... H04L 65/1093 |
| 2022/0109707 | A1* | 4/2022 | Butterfield .......... G06Q 10/103 |
| 2022/0147197 | A1* | 5/2022 | Tross .................... G06F 40/103 |
| 2022/0263877 | A1* | 8/2022 | Conlin ................ H04L 65/4015 |
| 2022/0365793 | A1* | 11/2022 | Weiss ...................... H04L 65/402 |
| 2023/0244802 | A1* | 8/2023 | Paul ...................... G06F 16/176 |
| | | | 707/608 |
| 2023/0247068 | A1* | 8/2023 | Weiss .................. H04L 65/1069 |
| | | | 709/204 |
| 2023/0297556 | A1* | 9/2023 | Szigeti .................. H04L 65/403 |
| | | | 715/229 |

OTHER PUBLICATIONS

U.S. Appl. No. 18/071,350, Non-Final Office Action dated Jul. 18, 2023.

* cited by examiner

REAL-TIME UPDATES FOR DOCUMENT COLLABORATION SESSIONS IN A GROUP-BASED COMMUNICATION SYSTEM

TECHNICAL FIELD

Aspects of the present disclosure generally relate to collaborative documents in a group-based communication system. More specifically, aspects of the present disclosure relate to real-time systems for collaborative documents in a group-based communication system.

BACKGROUND

Real time collaboration between users has become increasingly important as users are often working remotely from one another. Transmitting updates for events in a document that users are collaborating on in real time is vital to maintain a good user experience. As the number of users in a document increases, bottlenecks and scaling issues can arise in handling the number of events accompanying the increase in users.

BRIEF DESCRIPTION OF THE FIGURES

Aspects of the present disclosure are described in detail below with reference to the attached drawing figures, wherein.

Figure 1:
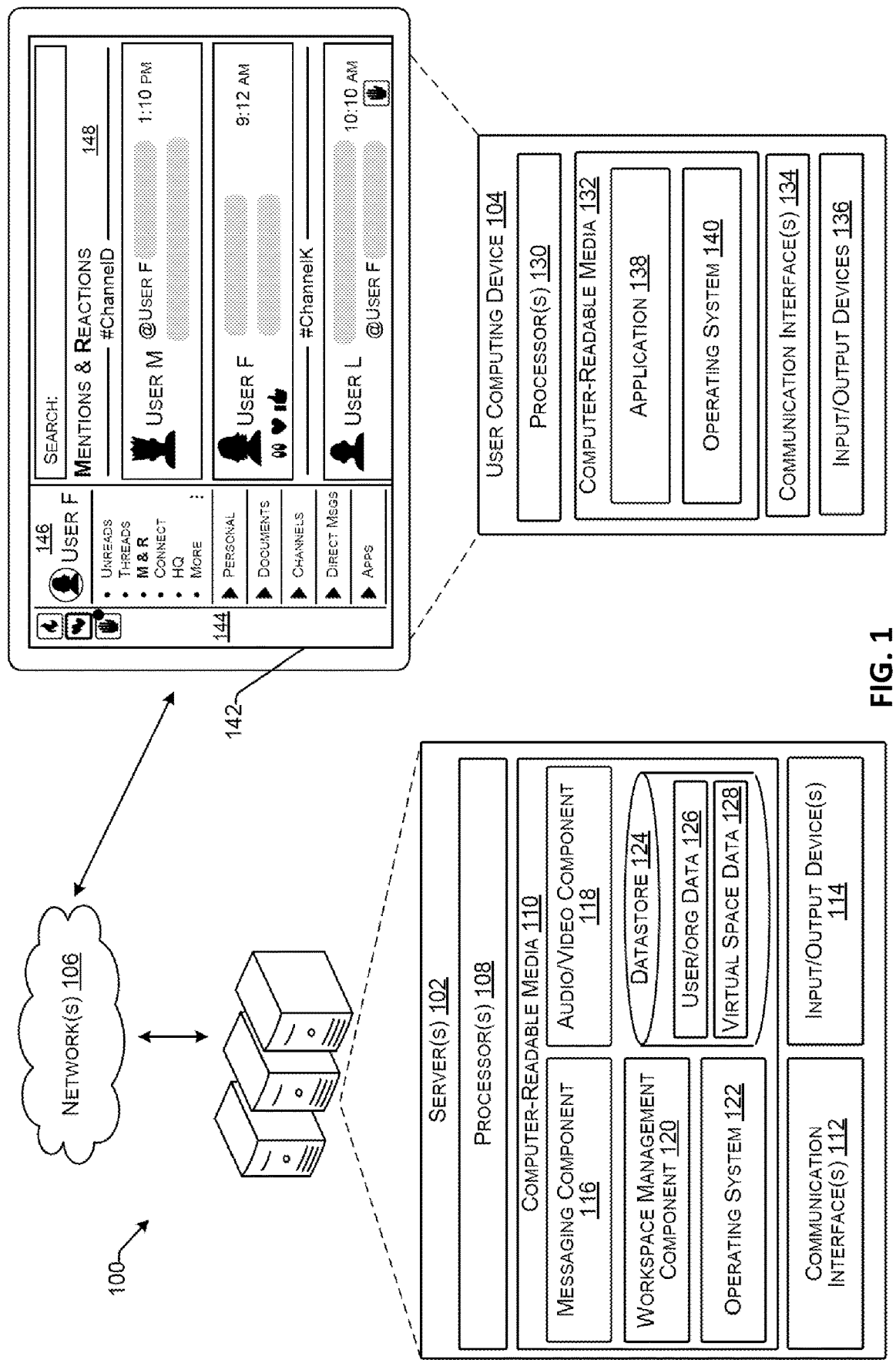
FIG. 1 illustrates an exemplary environment for certain aspects.

The drawing figures do not limit the present disclosure to the specific aspects disclosed and described herein. The drawings are not necessarily to scale, emphasis instead being placed upon clearly illustrating the principles of the present disclosure.

DETAILED DESCRIPTION

Aspects of the present disclosure provide a technical solution to one or more of the technical problems described above by providing systems and methods that, among other technical benefits, reduce latency and bottlenecks and provide increased scalability for managing real-time collaboration in document collaboration sessions in group-based communication systems. For example, the use of multiple servers to handle various aspects of communicating updates to clients may reduce bottlenecking and is more scalable than the use of a single service to handle all aspects of real-time updates for collaborative documents. Other technical benefits will be readily apparent to one of skill in the art upon reading this disclosure.

In some aspects, the techniques described herein relate to one or more non-transitory computer-readable media storing computer-executable instructions configurable to cause at least one processor to perform a method for real-time updates for a document collaboration session in a group-based communication system, the method including: responsive to initiation of the document collaboration session in the group-based communication system, creating, at a server, an ephemeral channel for the document collaboration session; responsive to a user connecting to the document collaboration session, subscribing the user to the ephemeral channel; receiving, at the server, one or more real-time events in the document collaboration session; determining whether the user has disconnected from the document collaboration session; responsive to a determination that the user has disconnected from the document collaboration session, unsubscribing the user from the ephemeral channel; and transmitting, in real time and from the server, the one or more real-time events to a plurality of subscribed users via the ephemeral channel.

In some aspects, the techniques described herein relate to a media, wherein the method further includes: receiving one or more update events in the document collaboration session, the one or more update events including an update identifier and an update payload; responsive to receiving the one or more update events, transmitting the update identifier to the plurality of subscribed users via the server and storing the update payload in a database; and responsive to receiving an update request from a subscribed user, transmitting the update payload to the subscribed user, wherein the update request includes the update identifier.

In some aspects, the techniques described herein relate to a media, wherein the method further includes: receiving a presence event from at least one user of the plurality of subscribed users indicating that the at least one user is connected to the document collaboration session; and transmitting the presence event to the plurality of subscribed users connected to the document collaboration session.

In some aspects, the techniques described herein relate to a media, wherein the user is connected to the document collaboration session via a first instance of the group-based communication system and wherein the method further includes: detecting, in a second instance of the group-based communication system, a second connection of the user to the document collaboration session while the user is still connected to the document collaboration session via the first instance; and responsive to detecting the second connection, generating a second subscription for the user to the ephemeral channel.

In some aspects, the techniques described herein relate to a media, wherein the method further includes: further responsive to determining that the user has disconnected from the document collaboration session, subscribing the user to a notification identifier associated with the ephemeral channel; and responsive to receiving one of an update event or a notification event in the document collaboration session while the user is unsubscribed from the ephemeral channel, transmitting a notification to the user via the group-based communication system.

In some aspects, the techniques described herein relate to a media, wherein the method further includes: receiving a request to change permissions for the document collaboration session, the request indicating a subset of the plurality of subscribed users to remove access to the document collaboration session; and responsive to receiving the request, unsubscribing the subset of the plurality of subscribed users from the ephemeral channel.

In some aspects, the techniques described herein relate to a media, wherein the method further includes: responsive to the user reconnecting to the document collaboration session after a disconnection, receiving a backlog request from the user, the backlog request including the ephemeral channel and a client sequence, and responsive to receiving the backlog request: generating an update sequence based on a difference between the client sequence and a server sequence associated with the ephemeral channel; and transmitting the update sequence to the user.

In some aspects, the techniques described herein relate to a method for real-time updates for a document collaboration session in a group-based communication system, the method including: responsive to initiation of the document collaboration session in the group-based communication system, creating, at a server, an ephemeral channel for the document collaboration session; responsive to a user connecting to the document collaboration session, subscribing the user to the ephemeral channel; receiving, at the server, one or more real-time events in the document collaboration session; determining whether the user has disconnected from the document collaboration session; responsive to a determination that the user has disconnected from the document collaboration session, unsubscribing the user from the ephemeral channel; and transmitting, in real time and from the server, the one or more real-time events to a plurality of subscribed users via the ephemeral channel.

In some aspects, the techniques described herein relate to a method, wherein the method further includes: receiving one or more update events in the document collaboration session, the one or more update events including an update identifier and an update payload; responsive to receiving the one or more update events, transmitting the update identifier to the plurality of subscribed users via the server and storing the update payload in a database; and responsive to receiving an update request from a subscribed user, transmitting the update payload to the subscribed user, wherein the update request includes the update identifier.

In some aspects, the techniques described herein relate to a method, wherein the method further includes: receiving a presence event from at least one user of the plurality of subscribed users indicating that the at least one user is connected to the document collaboration session; and transmitting the presence event to the plurality of subscribed users connected to the document collaboration session.

In some aspects, the techniques described herein relate to a method, wherein the user is connected to the document collaboration session via a first instance of the group-based communication system and wherein the method further includes: detecting, in a second instance of the group-based communication system, a second connection of the user to the document collaboration session while the user is still connected to the document collaboration session via the first instance; and responsive to detecting the second connection, generating a second subscription for the user to the ephemeral channel.

In some aspects, the techniques described herein relate to a method, wherein the method further includes: further responsive to determining that the user has disconnected from the document collaboration session, subscribing the user to a notification identifier associated with the ephemeral channel; and responsive to receiving one of an update event or a notification event in the document collaboration session while the user is unsubscribed from the ephemeral channel, transmitting a notification to the user via the group-based communication system.

In some aspects, the techniques described herein relate to a method, wherein the method further includes: receiving a request to change permissions for the document collaboration session, the request indicating a subset of the plurality of subscribed users to remove access to the document collaboration session; and responsive to receiving the request, unsubscribing the subset of the plurality of subscribed users from the ephemeral channel.

In some aspects, the techniques described herein relate to a method, wherein the method further includes: responsive to the user reconnecting to the document collaboration session after a disconnection, receiving a backlog request from the user, the backlog request including the ephemeral channel and a client sequence, and responsive to receiving the backlog request: generating an update sequence based on a difference between the client sequence and a server sequence associated with the ephemeral channel; and transmitting the update sequence to the user.

In some aspects, the techniques described herein relate to a system, including: at least one processor; and one or more non-transitory computer-readable media storing computer-readable instructions configurable to cause the at least one processor to perform a method for real-time updates for a document collaboration session in a group-based communication system, the method including: responsive to initiation of the document collaboration session in the group-based communication system, creating, at a server, an ephemeral channel for the document collaboration session; responsive to a user connecting to the document collaboration session, subscribing the user to the ephemeral channel; receiving, at the server, one or more real-time events in the document collaboration session; determining whether the user has disconnected from the document collaboration session; responsive to a determination that the user has disconnected from the document collaboration session, unsubscribing the user from the ephemeral channel; and transmitting, in real time and from the server, the one or more real-time events to a plurality of subscribed users via the ephemeral channel.

In some aspects, the techniques described herein relate to a system, wherein the method further includes: receiving one or more update events in the document collaboration session, the one or more update events including an update identifier and an update payload; responsive to receiving the one or more update events, transmitting the update identifier to the plurality of subscribed users via the server and storing the update payload in a database; and responsive to receiving an update request from a subscribed user, transmitting the update payload to the subscribed user, wherein the update request includes the update identifier; receiving a presence event from at least one user of the plurality of subscribed users indicating that the at least one user is connected to the document collaboration session; and transmitting the presence event to the plurality of subscribed users connected to the document collaboration session.

In some aspects, the techniques described herein relate to a system, wherein the user is connected to the document collaboration session via a first instance of the group-based communication system and wherein the method further includes: detecting, in a second instance of the group-based communication system, a second connection of the user to the document collaboration session while the user is still connected to the document collaboration session via the first instance; and responsive to detecting the second connection, generating a second subscription for the user to the ephemeral channel.

In some aspects, the techniques described herein relate to a system, wherein the method further includes: further responsive to determining that the user has disconnected from the document collaboration session, subscribing the user to a notification identifier associated with the ephemeral channel; and responsive to receiving one of an update event or a notification event in the document collaboration session while the user is unsubscribed from the ephemeral channel, transmitting a notification to the user via the group-based communication system.

In some aspects, the techniques described herein relate to a system, wherein the method further includes: receiving a request to change permissions for the document collaboration session, the request indicating a subset of the plurality of subscribed users to remove access to the document collaboration session; and responsive to receiving the request, unsubscribing the subset of the plurality of subscribed users from the ephemeral channel.

In some aspects, the techniques described herein relate to a system, wherein the method further includes: responsive to the user reconnecting to the document collaboration session after a disconnection, receiving a backlog request from the user, the backlog request including the ephemeral channel and a client sequence, and responsive to receiving the backlog request: generating an update sequence based on a difference between the client sequence and a server sequence associated with the ephemeral channel; and transmitting the update sequence to the user.

The following detailed description of aspects of the present disclosure references the accompanying drawings that illustrate specific aspects in which the present disclosure can be practiced. The detailed description is intended to describe aspects of the present disclosure in sufficient detail to enable those skilled in the art to practice the present disclosure. Other aspects can be utilized, and changes can be made without departing from the scope of the present disclosure. The following detailed description is, therefore, not to be taken in a limiting sense. The scope of aspects of the present disclosure is defined only by the appended claims, along with the full scope of equivalents to which such claims are entitled.

In this description, references to "one aspect," "an aspect," or "aspects" mean that the feature or features being referred to are included in at least one aspect of the technology. Separate reference to "one aspect," "an aspect," or "aspects" in this description do not necessarily refer to the same aspect and are also not mutually exclusive unless so stated and/or except as will be readily apparent to those skilled in the art from the description. For example, a feature, structure, or act described in one aspect may also be included in other aspects but is not necessarily included. Thus, the technology can include a variety of combinations and/or integrations of the aspects described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102, such as performing the methods described below. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication temporary identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication temporary identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication temporary identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
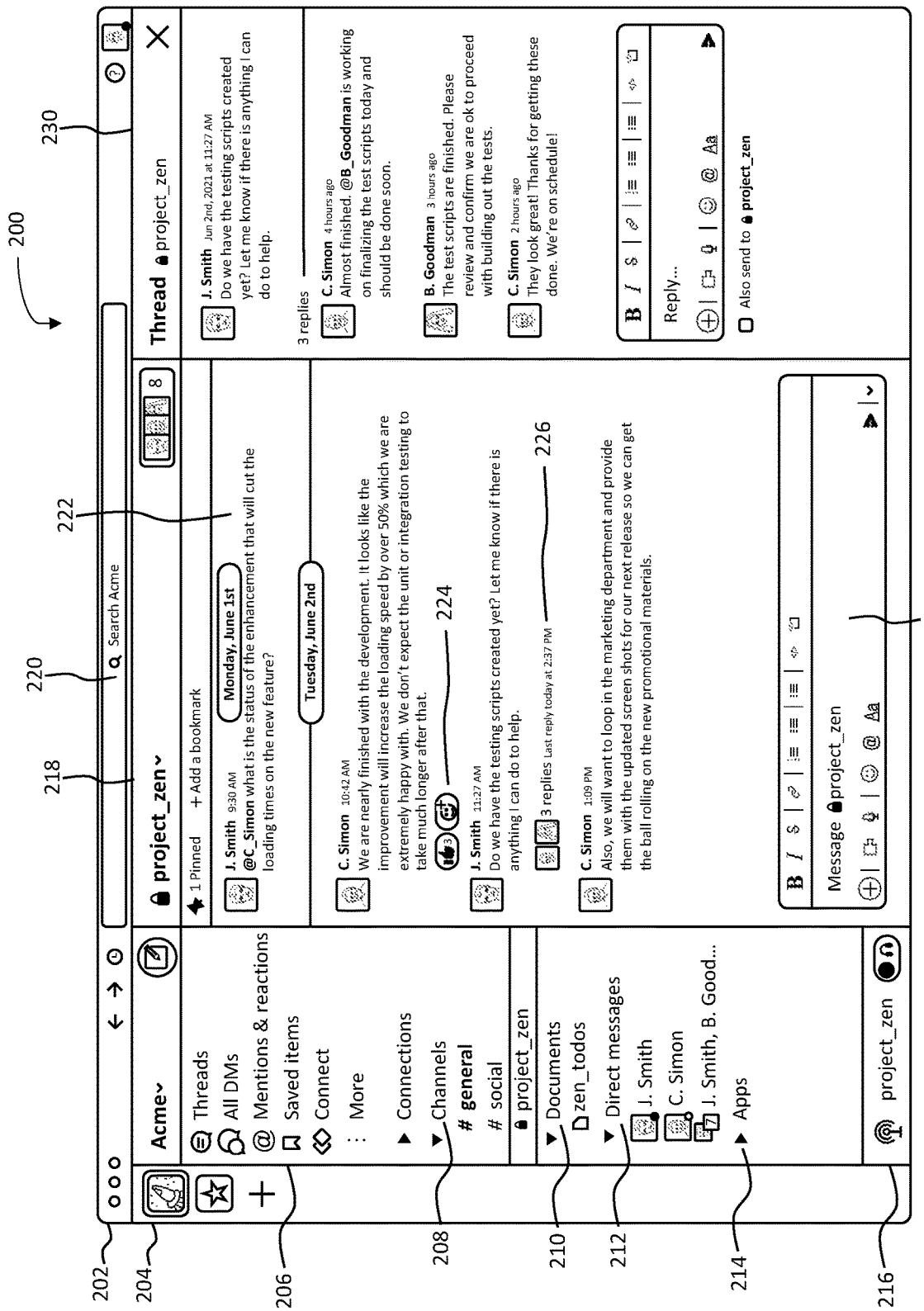
FIG. 2A illustrates a user interface for a group-based communication system for certain aspects.

FIG. 2A illustrates a user interface 200 of a group-based communication system, which will be useful in illustrating the operation of various aspects, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some aspects, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some aspects, title bar 202 comprises navigation commands allowing a user to move backwards and forwards between different panes, as well as to view a history of accessed content. Title bar 202 may comprise additional resources such as links to help documents and user configuration settings.

In some aspects, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some aspects, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some aspects, an organization, such as a particular company, may have a plurality of workspaces, and the user may be associated with one or more workspaces belonging to the organization. In yet other aspects, a particular workspace can be associated with one or more organizations or other entities associated with the group-based communication system.

In some aspects, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some aspects, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some aspects, all of the channels to which a user has been granted access may appear in navigation pane 206. In other aspects, the user may choose to hide certain channels or collapse sections containing certain channels. Items in navigation pane 206 may indicate when a new message or update has been received or is currently unread, such as by bolding the text associated with a channel in which an unread message is located or adding an icon or badge (for example, with a count of unread messages) to the channel name. In some aspects, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some aspects, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication temporary identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some aspects, channel pane 218 may display information related to a channel that a user has selected in navigation pane 206. For example, a user may select the project_zen channel to discuss the ongoing software development efforts for Project Zen. In some aspects, channel pane 218 may include a header comprising information about the channel, such as the channel name, the list of users in the channel, and other channel controls. Users may be able to pin items to the header for later access and to add bookmarks to the header. In some aspects, links to collaborative documents may be included in the header. In further aspects, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some aspects, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some aspects, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some aspects, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some aspects, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some aspects, compose pane 228 may enable additional formatting options such as numbered or bulleted lists via either the user interface or an API. Compose pane 228 may also function as a workflow trigger to initiate workflows related to a channel or message. In further aspects, links or documents sent via compose pane 228 may include unfurl instructions related to how the content should be displayed.

Synchronous Multimedia Collaboration Sessions

Figure 2B:
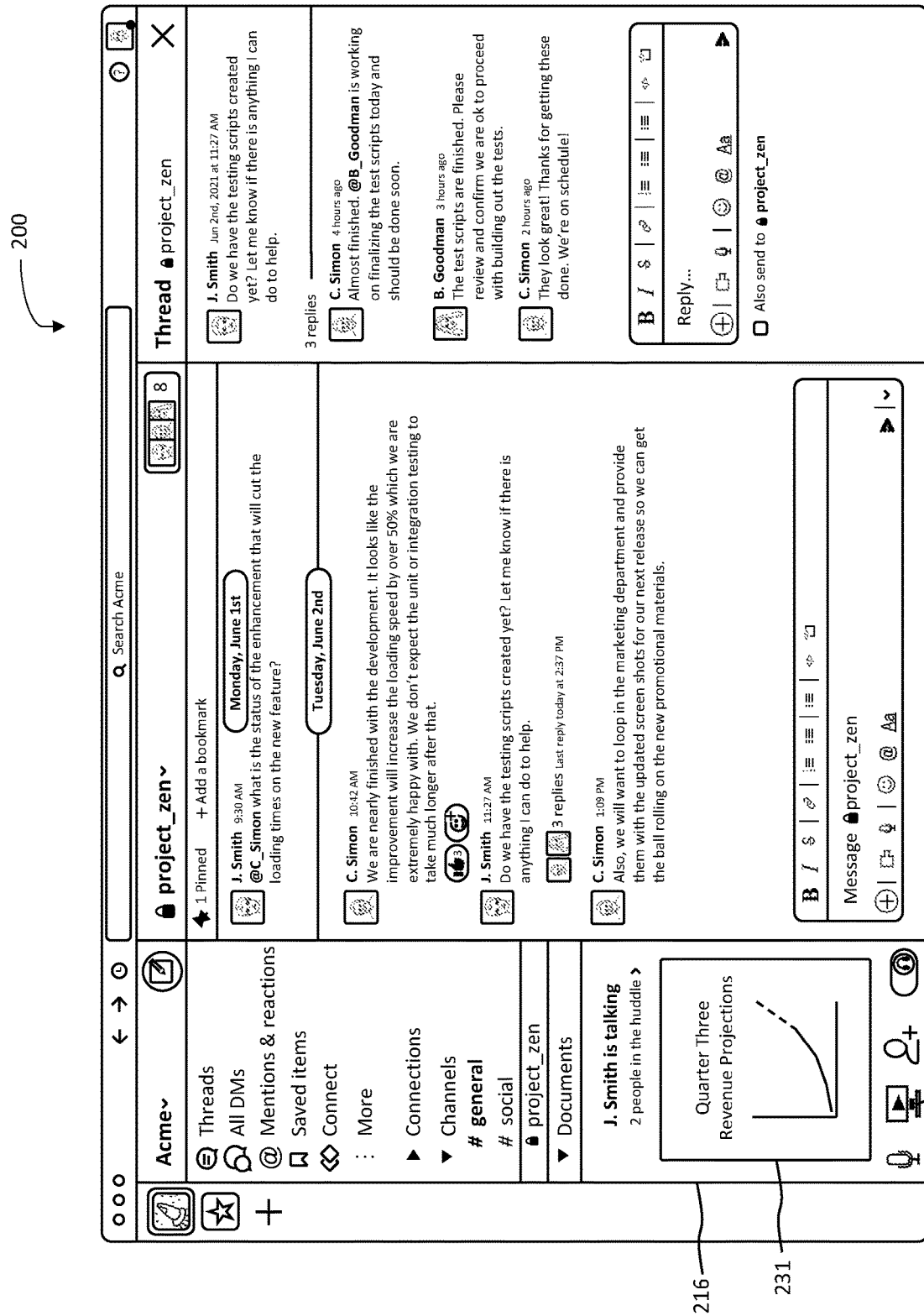
FIG. 2B illustrates a user interface for synchronous multimedia collaboration sessions within the group-based communication system for certain aspects.

FIG. 2B illustrates a synchronous multimedia collaboration session that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some aspects, synchronous multimedia collaboration sessions may be based around a particular topic, a particular channel, a particular direct message or multi-person direct message, or a set of users, while in other aspects, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some aspects, the audience of a synchronous multimedia collaboration session may be determined based on the context in which the synchronous multimedia collaboration session was initiated. For example, starting a synchronous multimedia collaboration session in a channel may automatically invite the entire channel to attend. As another example, starting a synchronous multimedia collaboration session allows the user to start an immediate audio and/or video conversation with other members of the channel without relying on scheduling or initiating a communication session through a third-party interface. In some aspects, users may be directly invited to attend a synchronous multimedia collaboration session via a message or notification.

Synchronous multimedia collaboration sessions may be short, ephemeral sessions from which no data is persisted. Alternatively, in some aspects, synchronous multimedia collaboration sessions may be recorded, transcribed, and/or summarized for later review. In other aspects, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some aspects, members of the synchronous multimedia collaboration session may mark-up, comment on, draw on, or otherwise annotate a shared screen. In further aspects, such annotations may be saved and persisted after the synchronous multimedia collaboration session has ended. A canvas may be created directly from a synchronous multimedia collaboration session to further enhance the collaboration between users.

In some aspects, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some aspects, users in the synchronous multimedia collaboration session may be displayed with an icon indicating that they are participating in the synchronous multimedia collaboration session. In further aspects, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some aspects, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some aspects, synchronous multimedia collaboration session pane 216 may comprise screen share button 232. Screen share button 232 may permit a user to share the user's screen with other members of the synchronous multimedia collaboration session pane 216. In some aspects, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some aspects, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some aspects, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some aspects, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some aspects, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some aspects, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some aspects, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some aspects, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some aspects, a preview of a subset of video replies may be shown in the asynchronous collaboration session or thread. This can allow, for example, a user to jump to a relevant segment of the asynchronous multimedia collaboration session or to pick up where they left off previously.

In some aspects, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some aspects, canvases can be configured to enable sharing of content including (but not limited to) text, images, videos, GIFs, drawings (e.g., user-generated drawings via a drawing interface), or gaming content. In some aspects, users accessing a canvas can add new content or delete (or modify) content previously added. In some aspects, appropriate permissions may be utilized for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting Within the Group-Based Communication System

Figure 2C:
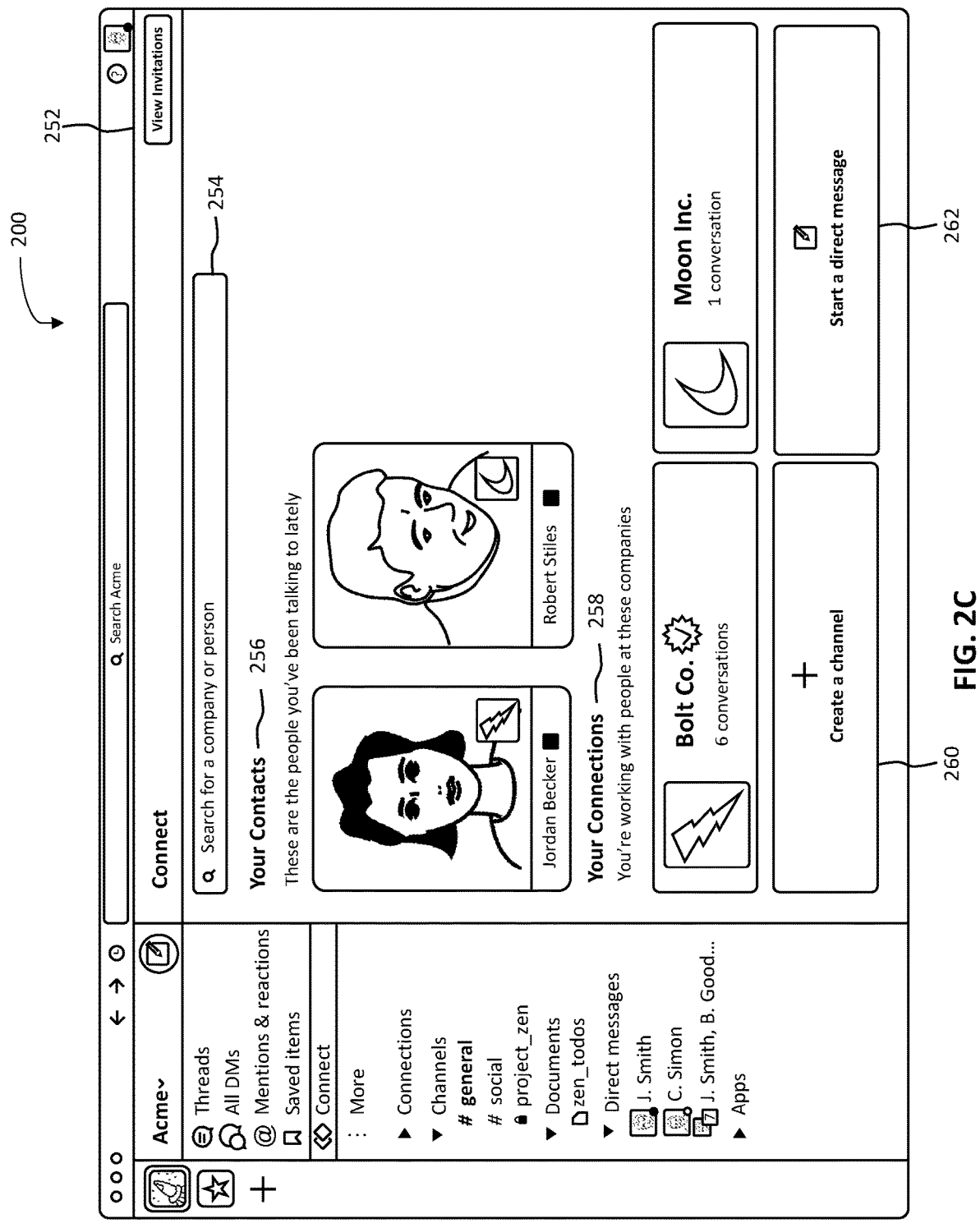
FIG. 2C illustrates a user interface for inter-organization collaboration within the group-based communication system for certain aspects.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some aspects, only users from organizations that have connected with the user's organization will be shown in the search results. In other aspects, users from any organization that uses the group-based communication system can be displayed. In still other aspects, users from organizations that do not yet use the group-based communication can also be displayed, allowing the searching user to invite them to join the group-based communication system. In some aspects, users can be searched for via their group-based communication system username or their email address. In some aspects, email addresses may be suggested or autocompleted based on external sources of data such as email directories or the searching user's contact list.

In some aspects, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some aspects, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some aspects each recent contact of recent contacts 256 may be an actuatable control allowing the instant user to quickly start a direct message conversation with the recent contact, invite them to a channel, or take any other appropriate user action for that recent contact.

In some aspects, connections 258 may display a list of companies (e.g., organizations) with which the user has interacted. For each company, the name of the company may be displayed along with the company's logo and an indication of how many interactions the user has had with the company, for example the number of conversations. In some aspects, each connection of connections 258 may be an actuatable control allowing the instant user to quickly invite the external organization to a shared channel, display recent connections with that external organization, or take any other appropriate organization action for that connection.

In some aspects, create channel button 260 allows a user to create a new shared channel between two different organizations. Selecting create channel button 260 may further allow a user to name the new connect channel and enter a description for the connect channel. In some aspects, the user may select one or more external organizations or one or more external users to add to the shared channel. In other aspects, the user may add external organizations or external users to the shared channel after the shared channel is created. In some aspects, the user may elect whether to make the connect channel private (i.e., accessible only by invitation from a current member of the private channel).

In some aspects, start direct message button 262 allows a user to quickly start a direct message (or multi-person direct message) with external users at an external organization. In some aspects, the external user identifier at an external organization may be supplied by the instant user as the external user's group-based communication system username or as the external user's email address. In some aspects, an analysis of the email domain of the external user's email address may affect the message between the user and the external user. For example, the external user's identifier may indicate (for example, based on an email address domain) that the user's organization and the external user's organization are already connected. In some such aspects, the email address may be converted to a group-based communication system username.

Alternatively, the external user's identifier may indicate that the external user's organization belongs to the group-based communication system but is not connected to the instant user's organization. In some such aspects, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
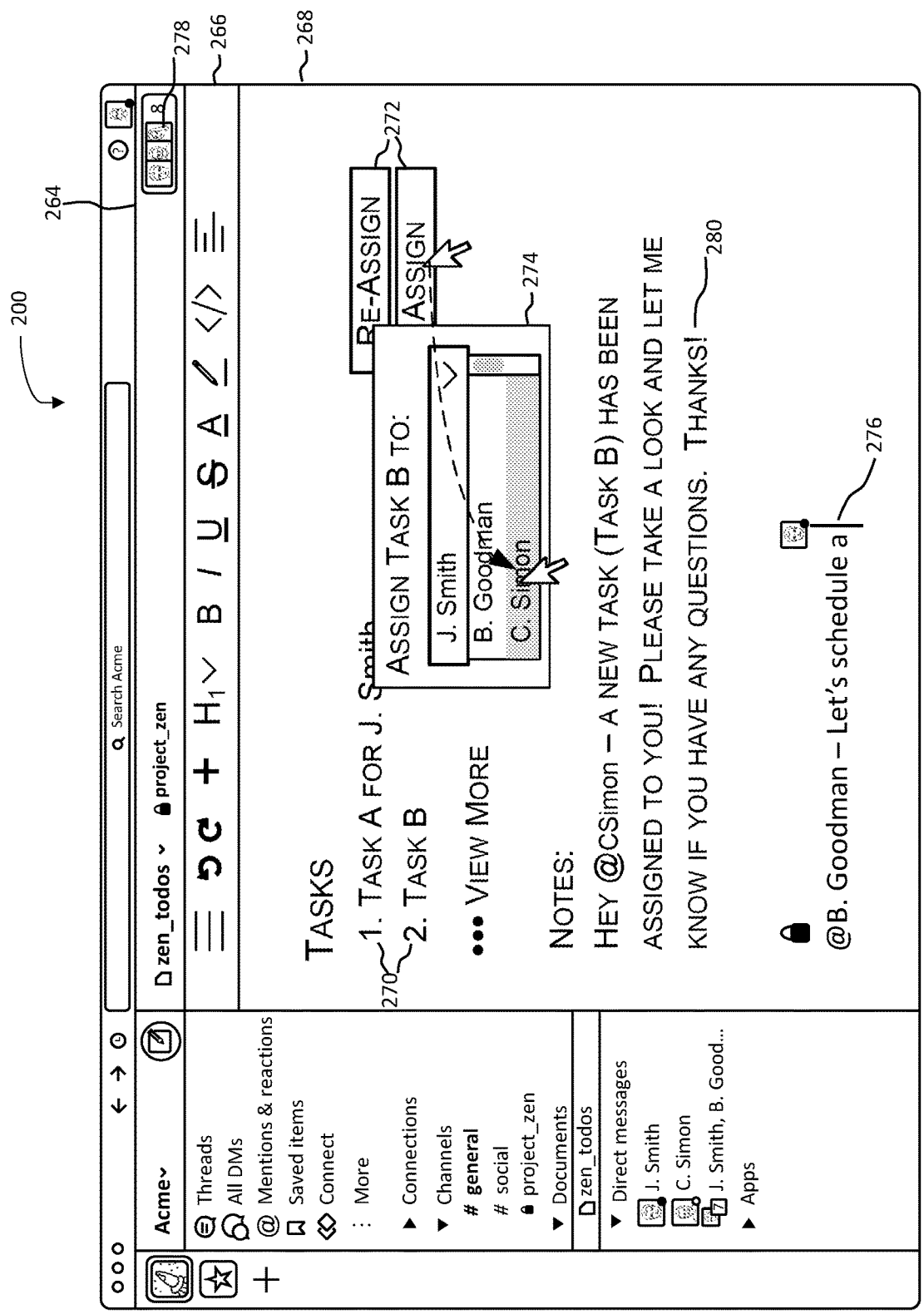
FIG. 2D illustrates a user interface for collaborative documents within the group-based communication system for certain aspects.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to simultaneously or asynchronously create and modify documents. Collaboration document pane 264 may comprise collaborative document toolbar 266 and collaborative document 268. In some aspects, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some aspects, collaborative documents may comprise free-form unstructured sections and workflow-related structured sections. In some aspects, users who are actively working in a section are given a lock that section such that other users are prevented from making changes to the section. Thus, conflicting edits of the document may be reduced. In some aspects, unstructured sections may include areas of the document in which a user can freely modify the collaborative document without any constraints. For example, a user may be able to freely type text to explain the purpose of the document. In some aspects, a user may add a workflow or a structured workflow section by typing the name of (or otherwise mentioning) the workflow. In further aspects, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some aspects, structured sections may include text entry, selection menus, tables, checkboxes, tasks, calendar events, or any other document section. In further aspects, structured sections may include text entry spaces that are a part of a workflow. For example, a user may enter text into a text entry space detailing a reason for approval, and then select a submit button that will advance the workflow to the next step of the workflow. In some aspects, the user may be able to add, edit, or remove structured sections of the document that make up the workflow components.

In aspects, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further aspects, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In aspects, the first user can select the plurality of collaborative documents and the "Group Information" section to effectuate permissions to access (or view, edit, etc.) to the entire user group the "Group Information" section of each of the plurality of collaborative documents. In some aspects, the collaborative document comprises one or more tasks 270 along with one or more corresponding assignment options 272, as shown. In some aspects, an assignment dropdown menu 274 may be displayed in response to a user selecting one of the one or more assignment options 272.

Notifications of events occurring in the collaborative document may utilize a publish/subscribe ("pub/sub") architecture. In some aspects, upon creation of a collaborative document, an ephemeral channel is created for the collaborative document. As used herein, an ephemeral channel is a channel to which clients are dynamically subscribed, e.g., a client may be subscribed to the ephemeral channel when connecting thereto and unsubscribed when disconnecting therefrom. Thus, in contrast to a permanent channel, a client who is not currently connected to the ephemeral channel (i.e., does not have the collaborative document opened) may not receive updates for the ephemeral channel even if the client was previously subscribed to the ephemeral channel. As discussed further herein, in some aspects of the present disclosure, clients may maintain permanent subscriptions to one or more update types for the ephemeral channel. An ephemeral channel may itself by temporary (depending on whether any users are subscribed) or permanent (for example, existing as long as the document exists); here, "ephemeral" relates to the users' subscriptions rather than the channel itself. In some aspects, the ephemeral channel has a temporary identifier and a notification or permanent identifier. In some aspects, a second channel is created for the notification identifier such that a collaborative document has a first channel to which users temporarily subscribe for real time events while connected to the collaborative document and a second channel to which users can permanently subscribe to receive event notifications while not connected to the collaborative document. When a user connects to the collaborative document, the user may be subscribed to the temporary and/or notification identifiers. In some aspects, the user is connected to the collaborative document when the user opens the collaborative document. The user may not be connected to the document when the user is viewing a preview of the collaborative document. When a user transmits an event, the event may be published to a message broker or other service managing the pub/sub services, which then publishes the event to other users subscribed to the ephemeral channel. In some aspects, the subscription is a temporary subscription such that the user is unsubscribed from the ephemeral channel upon disconnecting from the collaborative document and no longer receives updates made in the collaborative document. As discussed below, if the user is subscribed to the notification identifier, the user may receive certain updates associated with the collaborative document when the user is not connected to the collaborative document.

In some aspects, events in the collaborative document comprise transient events (also referred to as real time events), presence events, and persisted events. As used herein, an event (i.e., transient, presence, or persisted) refers to the data sent between a client and the group-based communication system, while an update (i.e., transient, presence, or persisted) refers to the rendered display of the event on a user interface in the group-based communication system. For example, when a user is typing or otherwise actively working in the collaborative document, a transient update 276 for a transient event published by another user may be displayed. In some aspects, the transient update 276 corresponds to the text typed by the publishing user. Thus, users in the collaborative document can see typing changes made by other users substantially in real time. For example, user J. Smith may be in the process of typing "@B. Goodman—let's schedule a follow up meeting to discuss", and transient updates 276 of the text typed by the user J. Smith may be published to the subscribed users. In some aspects, the transient update 276 displays an indication (e.g., profile picture, user identifier, etc.) for the publishing user. In some aspects, transient update 276 displays an element, such as a flashing cursor element, indicating that a user is currently typing. In some aspects, the transient update 276 includes an indication that the publishing user is currently typing. Further, as shown, a lock graphical element is displayed indicating that the currently typing user has a lock on the current section and other users are unable to concurrently edit the section of the document that J. Smith is currently editing. In some aspects, transient events are sent via a Websocket connection from the publishing user to one or more subscribed users. In some aspects, transient events are published about every 100 ms such that subscribed users can see the changes substantially in real time.

Presence updates 278 indicative of a presence event may be displayed in a participant preview in collaboration document pane 264. Presence updates 278 indicate that a user is connected to the document collaboration session. As shown, eight users are currently connected to the collaborative document and have their user profiles pictures displayed in the participant preview. Selection of the participant preview may cause display of a full list of all users connected to the document collaboration session and status indicators for each user may be indicated as described above. In some aspects, presence updates 278 are displayed proximate to where the associated user is actively working in the document. For example, the user profile picture for J. Smith is displayed near the transient update 276 indicating that J. Smith is typing. If a presence event is no longer received from a user, the user may be removed from display in the participant preview. In some aspects, a user no longer broadcasts presence events when the user disconnects from the collaborative document and/or when the user is no longer active in the collaborative document. In some aspects, a notification or other communication is published to the subscribed clients when a client disconnects (e.g., "J. Smith has left the document."). Like transient events, presence events may be sent from a publishing user through a Websocket connection and then published to a plurality of subscribed users.

Document updates 280 indicative of a persisted event are also shown. Changes made by a user to the collaborative document may be written to a database and fetched by the subscribing users, as discussed further below. For example, the addition of text, creation of a workflow, changing of permissions, changing of document metadata (e.g., renaming the document, etc.), and the like may be considered document updates 280. As shown, the notes added in the collaborative document, along with the created tasks are persisted changes to the collaborative document that may be transmitted as persisted events.

In some aspects, users can permanently subscribe to all events or a subset of events such that the permanently subscribed users receive notifications of events regardless of whether the user is currently connected to the collaborative document. In some aspects, when a user connects to the collaborative document for the first time, the user is permanently subscribed to a notification identifier associated with the ephemeral channel. In some aspects, users can opt in and out of the permanent subscription. In some aspects, users can specify which events to be notified of via the permanent subscription. In some aspects, changes made to the collaborative document that are associated with the subscribed user may be published via the notification identifier. For example, if a first user @mentions a second user in the collaborative document, the @mention may be communicated to the second user even if the second user is not currently connected to the collaborative document. As another example, changes to the collaborative document that modify previous changes made by a user may be communicated via the notification identifier. As yet another example, if a user leaves a comment in the collaborative document, and another user replies to the comment, the reply may be communicated to the user via the notification identifier. In some aspects, user interface 200 comprises a notification element 282 that may be actuated by a user to toggle the user's subscription to the notification identifier.

Real-Time Updates in Document Collaboration Sessions

Figure 3A:
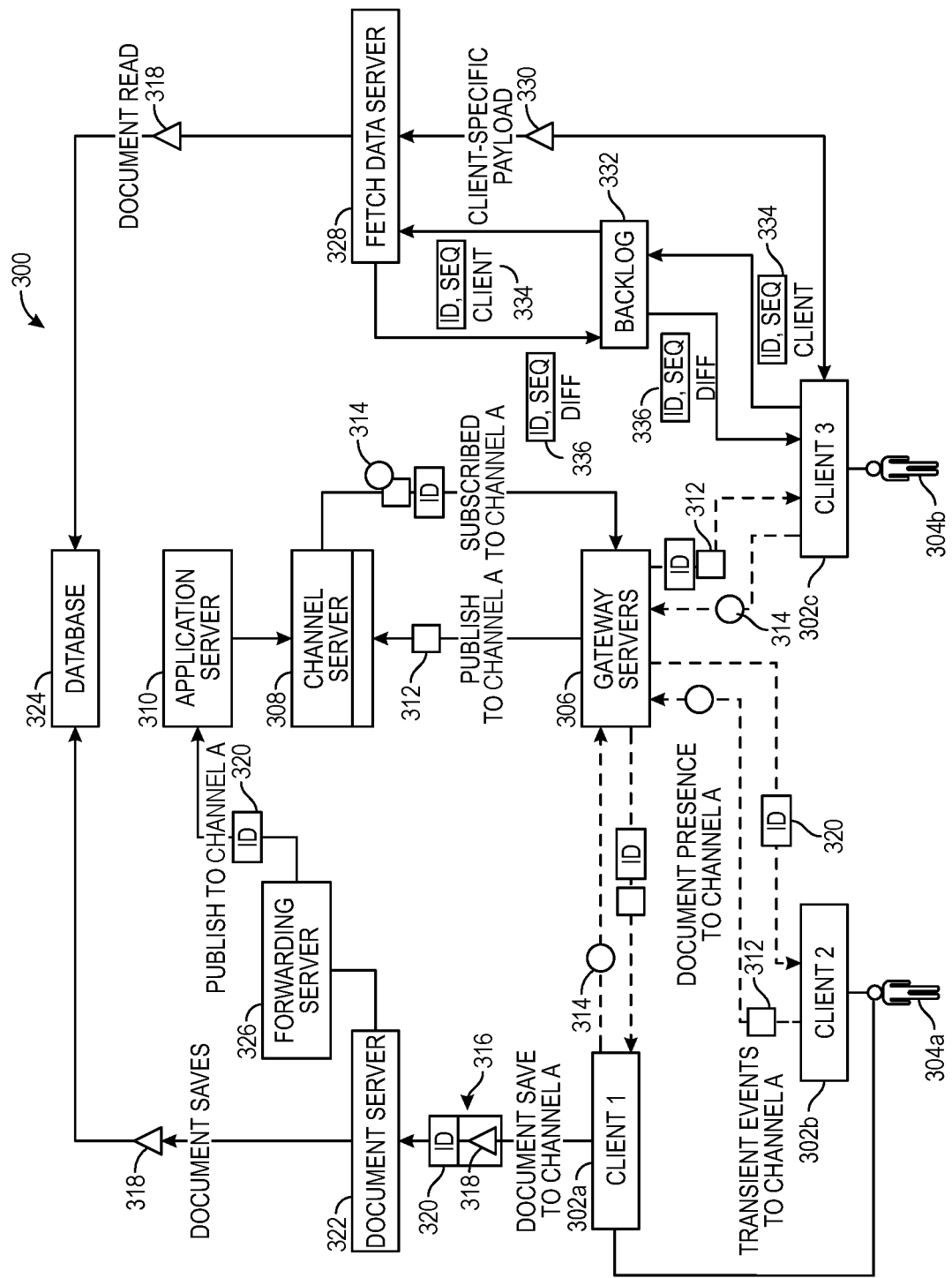
FIG. 3A illustrates a first block diagram for a first exemplary system for real-time updates for document collaboration sessions for certain aspects.
Figure 3B:
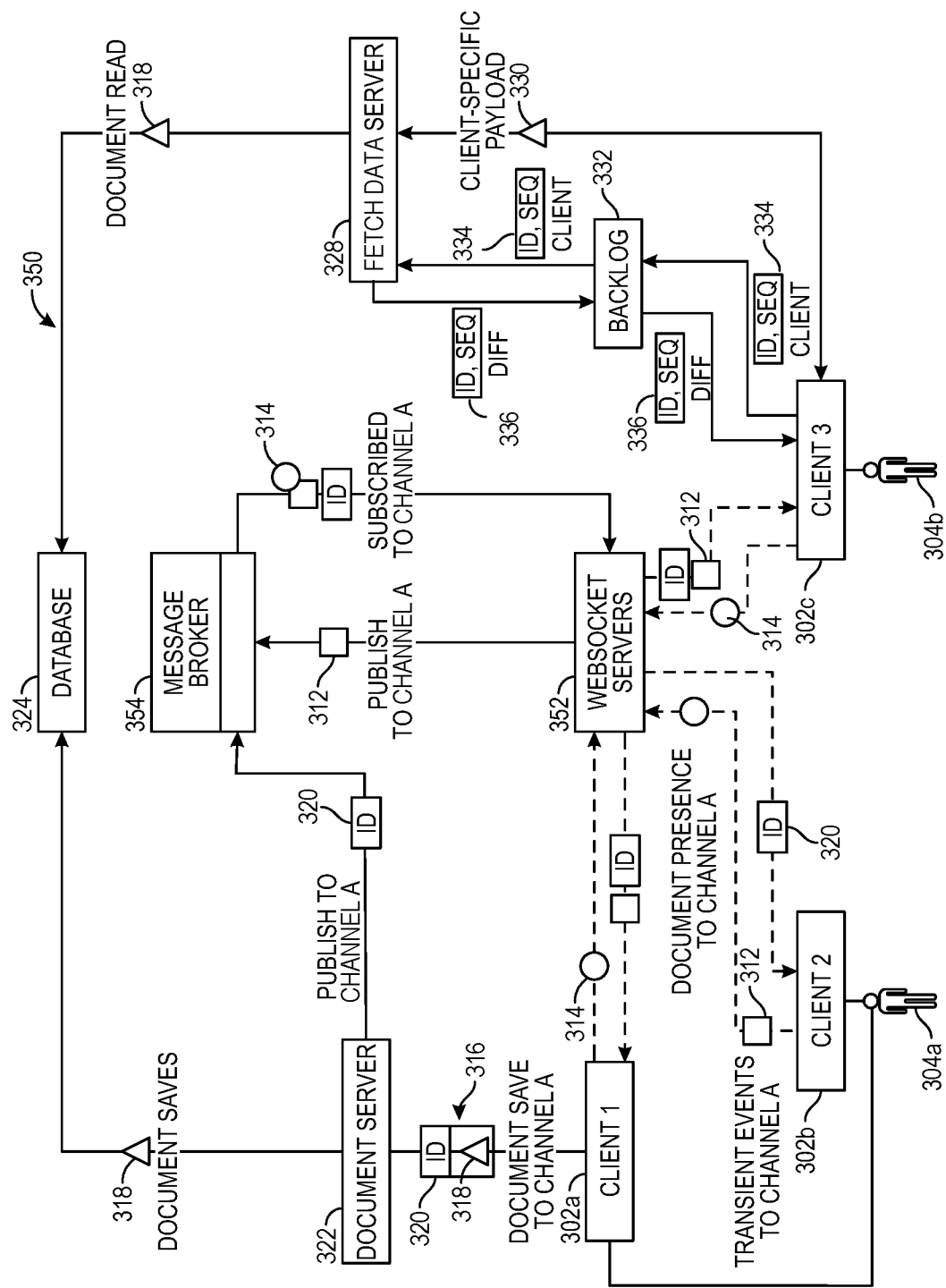
FIG. 3B illustrates a second block diagram for a second exemplary system for real-time updates for document collaboration sessions for certain aspects.

FIG. 3A depicts a first block diagram of a system 300 for real-time updates in document collaboration sessions in accordance with aspects of the present disclosure. In some aspects, the real-time or near real-time updates are one of a transient update, a document presence update, or a persisted update as discussed above. Transient events may indicate when a user is actively typing in or otherwise editing the collaborative document. Presence events may indicate that the user is connected to (for example, viewing) the collaborative document. Persisted events may include changes made to the collaborative document, such as the addition or deletion of text or formatting in the document. In some aspects, the events are published at distinct intervals. For example, transient events may be sent substantially in real-time (e.g., about every 50 ms, 100 ms, 200 ms), presence events may be sent about every 1 s, 2 s, or 5s and persisted events may be sent about every 5 s, 10 s, or 20s. In FIGS. 3A and 3B, transient payloads are represented with a square, presence payloads are represented with a circle, and update payloads for persisted events are represented with a triangle. Additionally, HTTP connections are represented with a solid line and Websocket connections are represented with a dashed line. It will be appreciated that other communication methods can be employed to transmit events within system 300 without departing from the scope hereof, and update frequencies other than those expressly listed are also contemplated.

As discussed above, system 300 may utilize a pub/sub architecture for communicating events, and upon a user creating a collaborative document, an ephemeral channel (e.g., "Channel A") may be created for the collaborative document. The ephemeral channel may have a temporary identifier such that, as users connect to the collaborative document, the users can be subscribed to the ephemeral channel via the temporary identifier. In some aspects, the temporary identifier can be derived from a name of the collaborative document, a name of a channel associated with the collaborative document, a locally unique value, a globally unique value, or a combination of two or more of these name types. In some aspects, the ephemeral channel is also associated with a notification identifier for permanent subscriptions to the ephemeral channel such that any changes to the document result in notifications for the permanently subscribed user. As discussed above, in some aspects, two channels are created for a collaborative document; one channel for temporary subscriptions, and a second channel for permanent subscriptions.

As shown, a first client 302a, a second client 302b, and a third client 302c are depicted and are connected to the same collaborative document. A first user 304a is operating first client 302a and second client 302b, and a second user 304a is operating second client 302c. It will be appreciated that many more clients can be simultaneously connected to a collaborative document, and that the three clients 302a, 302b, 302c are shown for sake of illustration. Upon a client 302a, 302b, 302c accessing the collaborative document (i.e., joining the document collaboration session), the client 302a, 302b, 302c may be connected to one of a plurality of gateway servers 306. In some aspects, gateway servers 306 are configured to manage connections for the document collaboration session. In some aspects, clients connect to gateway servers 306 via persistent Websocket connections. In some aspects, gateway servers 306 are edge servers.

Gateway servers 306 may be communicatively coupled to a channel server 308 that handles event publication and subscription for the ephemeral channel. Thus, the ephemeral channel and identifiers therefor may be stored at channel server 308. In some aspects, gateway servers 306 maintain a mapping between a user (e.g., a user identifier for the user) and the channels (both temporary and permanent, in some aspects) to which the user is subscribed. In some aspects, a single channel server 308 manages the ephemeral channel such that updates to the collaborative document only need to be published and subscribed to at a single server. Channel server 308, in turn, may be coupled to application server 310 that is configured to manage updates to the collaborative document, as discussed further below. Application server 310 may also communicate with gateway servers 306 to determine whether a client attempting to access the collaborative document is authorized to do so. If the client is authorized, application server 310 may transmit a Websocket URL to the client for connecting to the collaborative document.

In some aspects, application server 310 is configured to manage subscriptions to the ephemeral channel for a collaborative document. Application server 310 may sync subscriptions based on changes associated with the collaborative document. Application server 310 may also manage user access to collaborative documents as mentioned above. For example, if a creating user creates a collaborative document in a direct message, application server 310 may only grant access to the collaborative document to those users of the direct message. However, if the collaborative document is subsequently shared to a channel, application server 310 may sync the membership of that channel with the membership of the direct message such that all of the users in the channel now have access to the collaborative document. Likewise, if a channel user leaves the channel, application server 310 may remove the user's access to the collaborative document. Application server 310 may also be configured to perform batch unsubscriptions to a collaborative document.

Thus, if a collaborative document is shared in a public channel and subsequently made private or moved to a different channel, application server 310 may unsubscribe all users who are deemed to no longer have access to the collaborative document. As discussed above, gateway servers 306 may manage a mapping between a user and the user's subscribed ephemeral channels, and application server 310 may communicate with gateway servers 306 to update the mapping when unsubscribing users from collaborative documents. In some aspects, users can have varying levels of access to the collaborative document, such as view access, edit access, sharing access, or any combination thereof, and application server 310 may manage these access levels.

In some aspects, a single user can have multiple temporary subscriptions to a single ephemeral channel. For example, as shown, a first user 304a is operating both first client 302a and second client 302b. First client 302a may be an instance of the group-based communication system on a smartphone, and second client 302b may be an instance of the group-based communication system running on a web browser, for example. Thus, when first user 304a opens first client 302a on the smartphone, a first temporary subscription to the ephemeral channel for the collaborative document may be assigned to first client 302a. When first user 304a opens second client 302b via the web browser, while first client 302a is still running, a second temporary subscription to the ephemeral channel is assigned to second client 302b. Thus, the same user (i.e., the same user identifier) may have multiple temporary subscriptions to the same document collaboration session such that events are pushed to each client associated with the user.

As shown, second client 302b is transmitting a transient event 312. In some aspects, transient events 312 are sent via gateway servers 306 and published to the ephemeral channel (i.e., channel A). Channel server 308 may then publish the transient event 312, via gateway servers 306, to the users who are subscribed to channel A. Thus, the transient event 312 is transmitted from the publishing client (e.g., second client 302b) through the Websocket connection at gateway servers 306, to channel server 308, whereby channel server 308 publishes the transient event 312 via the Websocket connection the plurality of subscribed clients. In some aspects, the payload for a transient event 312 comprises the temporary identifier for the ephemeral channel, a metadata indicating the user has a lock on the section of the collaborative document that the user is typing in, and an indication that the event is a transient event. Once the subscribed clients receive transient event 312, a transient update 276 may be rendered in user interface 200 based on the payload for transient event 312 as described above. In some aspects, transient events 312 are broadcast about every 100 ms such that the subscribed clients can see which users are currently typing substantially in real time; however, other time intervals (e.g., 10 ms, 50 ms, etc.) may be used for transient events 312.

Clients may also transmit payloads for presence events 314 via gateway servers 306. As shown, each client 302a, 302b, 302c is transmitting a presence event 314. In some aspects, presence events 314 indicate that the user is connected to the collaborative document. Within system 300, presence events 314 may utilize the same data flow as transient events 312. That is, a publishing client may publish the presence event 314 via the Websocket connection managed by gateway servers 306 to channel server 308, and channel server 308 may publish the presence events 314 to the subscribed clients via gateway servers 306. In some aspects, the payload for a presence event 314 comprises the temporary identifier for the ephemeral channel, a user identifier for the publishing user, and an indication that the event is a presence event.

Once received, user interface 200 may render presence updates 278 for the presence event 314. In some aspects, when a client initially connects to the document collaboration session, the client receives an initial list of all active connections to the document collaboration session from the gateway servers 306. In some aspects, when a connection to gateway servers 306 is established for a client, gateway servers 306 query channel server 308 for all clients (e.g., users identifiers associated with the clients) that are subscribed to the ephemeral channel and transmits the information to the connecting client. In some aspects, clients publish presence events 314 about every 1-2 seconds; however, other time intervals (e.g., 5 s, 10 s, 20 s, etc.) may be used.

FIG. 3A also illustrates first client 302a transmitting a persisted event 316. Persisted events 316, such as edits or other modifications made to the collaborative document, may be published via a different path than transient events 312 and presence events 314. In some aspects, a persisted event 316 comprises a payload 318 and an identifier 320, both of which may be packaged and transmitted from the publishing client to a document server 322. Along with payload 318 and identifier 320, persisted events 316 may include other metadata, such as an object identifier for payload 318 and an indication that the event is a persisted event. Once a persisted event 316 is received, document server 322 may write the payload 318 to a database 324 and publish the identifier 320 to an application server 310. In some aspects, identifier 320 is transmitted to application server 310 via a forwarding server 326. In some aspects, forwarding server 326 is configured to communicate securely with application server 310. In some aspects, forwarding server 326 utilizes HMAC to securely communicate identifiers 320 to application server 310. From application server 310, identifier 320 may be transmitted to channel server 308 and then published to the subscribed clients via the Websocket connection.

To obtain the payload 318 from database 324, subscribed clients may interface with a data server 328. Specifically, to fetch payload 318 from database 324, a subscribed client (e.g., third client 302c as shown) may transmit the identifier 320 received from channel server 308 to data server 328. Based on the identifier 320, data server 328 may retrieve the corresponding payload 318 from database 324 and return the payload 318 to the requesting client. Thus, in some aspects, persisted events 316 take the following path: from the publishing client to document server 322 whereby identifier 320 is sent to application server 310 via forwarding server 326 and then to channel server 308, which publishes identifier 320 to the subscribed clients via the gateway servers 306. Meanwhile, document server 322 writes payload 318 to database 324, and the subscribed clients transmit identifier 320 to data server 328 to retrieve payload 318. The subscribed clients can then update the collaborative document to render payload 318 as a document update 280. In some aspects, data server 328 is configured to make one or more modifications to payload 318 based on requests from the client such that a client-specific payload 330 is transmitted to the client.

For example, third client 302c may have a customized display of the collaborative document, and data server 328 may modify payload 318 to create a client-specific payload 330 that adheres to the customized display for third client 302c. Such a customized view might be as simple as displaying a user's own username as "you" when displaying an edit history or might include a completely custom view of the collaborative document based on user settings and configuration. In some aspects, system 300 checks for persisted events 316 about every 10 s; however, other time intervals (e.g., 5 s, 15 s) may be used. In some aspects, persisted events 316 are packaged and sent to document server 322 responsive to a client manually saving the collaborative document. Document server 322 may be configured to deduplicate, merge, and otherwise handle conflicting changes made in the collaborative document.

In some aspects, system 300 also comprises a backlog server 332 that serves clients needing to catch up on changes to the collaborative document. For example, backlog server 332 may handle requests for updates in the event that third client 302c becomes temporarily disconnected from the collaborative document. In some aspects, upon reconnecting, third client 302c is configured to automatically trigger a backlog request to backlog server 332. The backlog request may comprise a client primitive 334 comprising object identifier(s) and client sequence identifier(s) corresponding to the object identifier(s). The client sequence identifier may be the last sequence identifier before the client disconnected from the collaborative document. In some aspects, the client sequence identifier is the maximum sequence/timestamp on the client corresponding to the object identifier.

Once client primitive 334 is received at backlog server 332, backlog server 332 may query data server 328 for the latest version of the objects corresponding to the object identifiers. Using client primitive 334, data server 328 may generate a difference primitive 336 comprising a difference between the client sequence identifier and a server sequence identifier for the object identifier transmitted with client primitive 334. Thus, the difference primitive 336 may comprise the object identifier from client primitive 334 and the difference sequence identifier. Client-specific payload 330 may transmit difference primitive 336 to backlog server 332, and backlog server 332 may forward difference primitive 336 to the client. The client can use the difference primitive 336 to update the collaborative document. In some aspects, difference primitive 336 is transmitted directly to the client via an HTTP response. Backlog server 332 may also handle document updates when a user connects to the document for the first time and/or for updates after the user has voluntarily disconnected and reconnected to the document collaboration session using the above described process.

FIG. 3B depicts a second block diagram of an alternative system 350 in accordance with aspects of the present disclosure. Where common features or elements are unchanged, they are not discussed separately from their description with respect to FIG. 3A. As with the above-described system 300, system 350 comprises clients 302a, 302b, 302c connected to a collaborative document. In system 350, clients 302a, 302b, 302c may be connected directly to Websocket servers 352. Websocket servers 352 may be connected to a message broker 354 that handles publications and subscriptions for the collaborative document. In some aspects, message broker 354 owns the ephemeral channel.

In system 350, transient event 312 and presence events 314 may take the following data path: published from the publishing client to message broker 354 via Websocket servers 352 and published from message broker 354 to the subscribed clients via Websocket servers 352. Meanwhile, persisted events 316 may take the following data path: packaged and published from the publishing client to document server 322, whereby payload 318 is written to database 324 and identifier 320 is published to message broker 354. Message broker 354 may then publish identifier 320 to the subscribed clients via Websocket servers 352. The clients may fetch payload 318 by passing identifier 320 to data server 328, which may read payload 318 from database 324 and returns payload 318 to the subscribed clients. Data server 328 may make modifications to payload 318 to generate client-specific payload 330 based on request from the client as discussed above. In some aspects, when handling backlog requests, difference primitive 336 is forwarded from backlog server 332 to a listen server (not shown) and then streamed down to the subscribed clients via Websocket servers 352.

Figure 4:
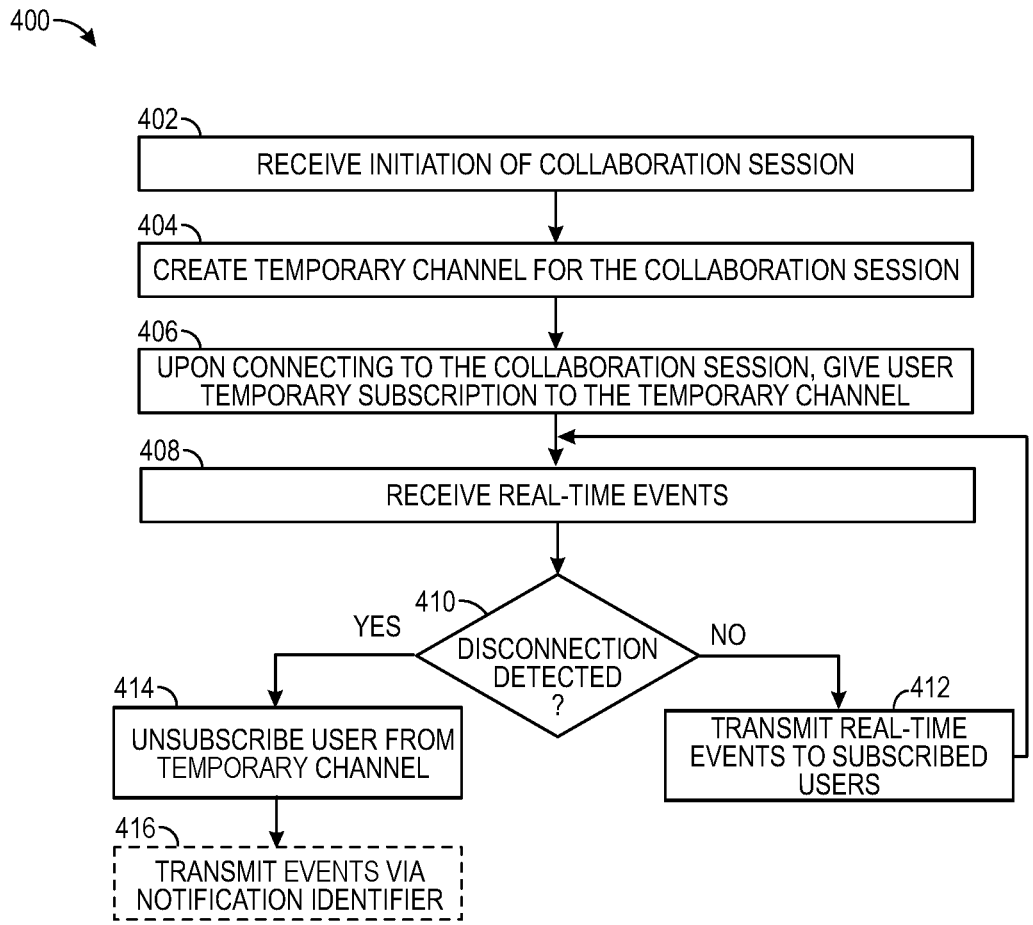
FIG. 4 illustrates an exemplary method for some aspects.

FIG. 4 depicts an exemplary method 400 in accordance with aspects of the present disclosure. Method 400 may begin at step 402 where initiation of a document collaboration session may be received. In some aspects, a document collaboration session is initiated when a collaborative document is created. In some aspects, a document collaboration session is initiated when a collaborative document is created and at least one user is connected to the collaborative document. Users may create collaborative documents from any portion of the group-based communication system, such as from a channel, a direct message, or a multiple person direct message. In some aspects, users can first create a collaborative document and subsequently select a channel, direct message, workspace, etc. to associate with the collaborative document.

At step 404, an ephemeral channel may be created for the document collaboration session. The ephemeral channel may be created at channel server 308 or message broker 354 in some aspects. In some aspects, the ephemeral channel comprises a temporary identifier for temporary subscriptions and a notification identifier for permanent subscriptions. In some aspects, a separate channel is created for each of the temporary identifier and the notification identifier. Thus, in some aspects, each collaborative document has two channels created therefor, and users may be temporarily subscribed to the channel having the temporary identifier and permanently subscribed to the channel having the notification identifier.

Next, at step 406, when a user connects to the document collaboration session, the user may be subscribed to the ephemeral channel via the temporary identifier. In some aspects, the subscription is a temporary subscription such that users are automatically unsubscribed from the ephemeral channel when the user disconnects from the document collaboration session. As such, when disconnected, the user may no longer be notified of events 312, 314, 316 occurring within the document collaboration session. Connections to the ephemeral channel may be carried out using Websocket connections.

At step 408, one or more real-time events may be received. In some aspects, the real-time event is at least one of a transient event 312, a presence event 314, or a persisted event 316. Publishing clients may transmit transient events 312 about every 100 ms, presence events 314 about every 1 s, and persisted events 316 about every 10 s and/or upon a document save.

At test 410 it may be determined if a disconnection has been detected. If a disconnection has not been detected, processing may proceed to step 412. If a disconnection has been detected, processing may proceed to step 414. A user may be considered disconnected when the user is no longer connected to the Websocket connection. In some aspects, a period of inactivity within the document collaboration session is indicative of a disconnected client regardless of whether the client is still connected to the Websocket connection. In some aspects, a client is considered disconnected responsive to presence event 314 no longer being transmitted by the client.

At step 412, when it is determined that a disconnection has not been detected, the real-time event may be transmitted to the subscribed users. Thus, as shown in FIG. 2D, the user interface 200 may display transient update 276 indicative of transient event 312 that a user is typing, presence updates 278 indicative of presence events 314 that a user is connected to the collaborative document, and document updates 280 indicative of persisted events 316 that a user has made a change to the document. Thereafter, processing may proceed back to step 408.

At step 414, when it is determined that a disconnection has been detected, the disconnecting user(s) may be unsubscribed from the ephemeral channel. Thus, in some aspects, disconnected users no longer receive real-time updates for the document collaboration session. When a disconnected client reconnects to the document collaboration session, the reconnecting client may automatically trigger a backlog request to obtain the most current version of the collaborative document as discussed above.

Processing may then proceed to optional step 416, where the user may be notified of events associated with the document collaboration session. In some aspects, the user can subscribe to notifications via a notification element 282 associated with the collaborative document. In some aspects, all users are automatically subscribed to the notification identifier upon connecting to the document collaboration session. In some aspects, users can configure settings for being subscribed to the notification identifier. In some aspects, the event is an event associated with the user, such as an @mention of the user. Thus, if another user @mentions the disconnected the user, the user may be alerted that something in the collaborative document requires their attention and can reconnect to the collaborative document. In some aspects, the event is a change in a section of the collaborative document associated with the user. For example, if the disconnected user had previously made changes to a section of the document, and the user's changes are later overwritten or otherwise modified by another user, the disconnected user may be notified of the new changes via the notification identifier. In some aspects, the user can be permanently subscribed to any of events 312, 314, 316.

While aspects herein have been discussed with respect to creating ephemeral channels for collaborative documents, it will be appreciated that ephemeral channels may be created to handle real-time updates for various other virtual spaces including workspaces, communication channels, direct messaging instances, canvases, and audio and/or video conversation without departing from the scope hereof.

Having thus described various aspects of the present disclosure, what is claimed as new and desired to be protected by Letters Patent includes the following:

1. One or more non-transitory computer-readable media storing computer-executable instructions configurable to cause at least one processor to perform a method for real-time updates for a document collaboration session in a group-based communication system, the method comprising:
   responsive to initiation of the document collaboration session in the group-based communication system, creating, at a server, an ephemeral channel for the document collaboration session;
   responsive to a user connecting to the document collaboration session, subscribing the user to the ephemeral channel;
   receiving, at the server, one or more real-time events in the document collaboration session;
   determining whether the user has disconnected from the document collaboration session;
   responsive to a determination that the user has disconnected from the document collaboration session, unsubscribing the user from the ephemeral channel; and
   transmitting, in real time and from the server, the one or more real-time events to a plurality of subscribed users via the ephemeral channel.

2. The one or more non-transitory computer-readable media of claim 1, wherein the method further comprises:
   receiving one or more update events in the document collaboration session, the one or more update events comprising an update identifier and an update payload;
   responsive to receiving the one or more update events, transmitting the update identifier to the plurality of subscribed users via the server and storing the update payload in a database; and
   responsive to receiving an update request from a subscribed user, transmitting the update payload to the subscribed user, wherein the update request comprises the update identifier.

3. The one or more non-transitory computer-readable media of claim 1, wherein the method further comprises:
   receiving a presence event from at least one user of the plurality of subscribed users indicating that the at least one user is connected to the document collaboration session; and
   transmitting the presence event to the plurality of subscribed users connected to the document collaboration session.

4. The one or more non-transitory computer-readable media of claim 1, wherein the user is connected to the document collaboration session via a first instance of the group-based communication system and wherein the method further comprises:
   detecting, in a second instance of the group-based communication system, a second connection of the user to the document collaboration session while
   the user is still connected to the document collaboration session via the first instance; and
   responsive to detecting the second connection, generating a second subscription for the user to the ephemeral channel.

5. The one or more non-transitory computer-readable media of claim 1, wherein the method further comprises:
   further responsive to determining that the user has disconnected from the document collaboration session, subscribing the user to a notification identifier associated with the ephemeral channel; and
   responsive to receiving one of an update event or a notification event in the document collaboration session while the user is unsubscribed from the ephemeral channel, transmitting a notification to the user via the group-based communication system.

6. The one or more non-transitory computer-readable media of claim 1, wherein the method further comprises:
   receiving a request to change permissions for the document collaboration session, the request indicating a subset of the plurality of subscribed users to remove access to the document collaboration session; and
   responsive to receiving the request, unsubscribing the subset of the plurality of subscribed users from the ephemeral channel.

7. The one or more non-transitory computer-readable media of claim 1, wherein the method further comprises:
   responsive to the user reconnecting to the document collaboration session after a disconnection, receiving a backlog request from the user, the backlog request comprising the ephemeral channel and a client sequence, and
   responsive to receiving the backlog request:
   generating an update sequence based on a difference between the client sequence and a server sequence associated with the ephemeral channel; and
   transmitting the update sequence to the user.

8. A method for real-time updates for a document collaboration session in a group-based communication system, the method comprising:
   responsive to initiation of the document collaboration session in the group-based communication system, creating, at a server, an ephemeral channel for the document collaboration session;
   responsive to a user connecting to the document collaboration session, subscribing the user to the ephemeral channel;
   receiving, at the server, one or more real-time events in the document collaboration session;
   determining whether the user has disconnected from the document collaboration session;
   responsive to a determination that the user has disconnected from the document collaboration session, unsubscribing the user from the ephemeral channel; and
   transmitting, in real time and from the server, the one or more real-time events to a plurality of subscribed users via the ephemeral channel.

9. The method of claim 8, wherein the method further comprises:
   receiving one or more update events in the document collaboration session, the one or more update events comprising an update identifier and an update payload;
   responsive to receiving the one or more update events, transmitting the update identifier to the plurality of subscribed users via the server and storing the update payload in a database; and
   responsive to receiving an update request from a subscribed user, transmitting the update payload to the subscribed user,
   wherein the update request comprises the update identifier.

10. The method of claim 8, wherein the method further comprises:
receiving a presence event from at least one user of the plurality of subscribed users indicating that the at least one user is connected to the document collaboration session; and
transmitting the presence event to the plurality of subscribed users connected to the document collaboration session.

11. The method of claim 8, wherein the user is connected to the document collaboration session via a first instance of the group-based communication system and wherein the method further comprises:
detecting, in a second instance of the group-based communication system, a second connection of the user to the document collaboration session while the user is still connected to the document collaboration session via the first instance; and
responsive to detecting the second connection, generating a second subscription for the user to the ephemeral channel.

12. The method of claim 8, wherein the method further comprises:
further responsive to determining that the user has disconnected from the document collaboration session, subscribing the user to a notification identifier associated with the ephemeral channel; and
responsive to receiving one of an update event or a notification event in the document collaboration session while the user is unsubscribed from the ephemeral channel, transmitting a notification to the user via the group-based communication system.

13. The method of claim 8, wherein the method further comprises:
receiving a request to change permissions for the document collaboration session, the request indicating a subset of the plurality of subscribed users to remove access to the document collaboration session; and
responsive to receiving the request, unsubscribing the subset of the plurality of subscribed users from the ephemeral channel.

14. The method of claim 8, wherein the method further comprises:
responsive to the user reconnecting to the document collaboration session after a disconnection, receiving a backlog request from the user, the backlog request comprising the ephemeral channel and a client sequence, and
responsive to receiving the backlog request:
generating an update sequence based on a difference between the client sequence and a server sequence associated with the ephemeral channel; and
transmitting the update sequence to the user.

15. A system, comprising:
at least one processor; and
one or more non-transitory computer-readable media storing computer-readable instructions configurable to cause the at least one processor to perform a method for real-time updates for a document collaboration session in a group-based communication system, the method comprising:
responsive to initiation of the document collaboration session in the group-based communication system, creating, at a server, an ephemeral channel for the document collaboration session;
responsive to a user connecting to the document collaboration session, subscribing the user to the ephemeral channel;
receiving, at the server, one or more real-time events in the document collaboration session;
determining whether the user has disconnected from the document collaboration session;
responsive to a determination that the user has disconnected from the document collaboration session, unsubscribing the user from the ephemeral channel; and
transmitting, in real time and from the server, the one or more real-time events to a plurality of subscribed users via the ephemeral channel.

16. The system of claim 15, wherein the method further comprises:
receiving one or more update events in the document collaboration session, the one or more update events comprising an update identifier and an update payload;
responsive to receiving the one or more update events, transmitting the update identifier to the plurality of subscribed users via the server and storing the update payload in a database;
responsive to receiving an update request from a subscribed user, transmitting the update payload to the subscribed user,
wherein the update request comprises the update identifier;
receiving a presence event from at least one user of the plurality of subscribed users indicating that the at least one user is connected to the document collaboration session; and
transmitting the presence event to the plurality of subscribed users connected to the document collaboration session.

17. The system of claim 15, wherein the user is connected to the document collaboration session via a first instance of the group-based communication system and wherein the method further comprises:
detecting, in a second instance of the group-based communication system, a second connection of the user to the document collaboration session while the user is still connected to the document collaboration session via the first instance; and
responsive to detecting the second connection, generating a second subscription for the user to the ephemeral channel.

18. The system of claim 15, wherein the method further comprises:
further responsive to determining that the user has disconnected from the document collaboration session, subscribing the user to a notification identifier associated with the ephemeral channel; and
responsive to receiving one of an update event or a notification event in the document collaboration session while the user is unsubscribed from the ephemeral channel, transmitting a notification to the user via the group-based communication system.

19. The system of claim 15, wherein the method further comprises:
receiving a request to change permissions for the document collaboration session, the request indicating a subset of the plurality of subscribed users to remove access to the document collaboration session; and
responsive to receiving the request, unsubscribing the subset of the plurality of subscribed users from the ephemeral channel.

20. The system of claim 15, wherein the method further comprises:
- responsive to the user reconnecting to the document collaboration session after a disconnection, receiving a backlog request from the user, the backlog request comprising the ephemeral channel and a client sequence, and
- responsive to receiving the backlog request:
- generating an update sequence based on a difference between the client sequence and a server sequence associated with the ephemeral channel; and
- transmitting the update sequence to the user.

\* \* \* \* \*